(12) United States Patent
Liu et al.

(10) Patent No.: US 9,684,780 B2
(45) Date of Patent: *Jun. 20, 2017

(54) DYNAMIC INTERACTIVE IDENTITY AUTHENTICATION METHOD AND SYSTEM

(71) Applicants: Yingjie Liu, Chaoyang (CN); Lianying Ji, Beijing (CN)

(72) Inventors: Yingjie Liu, Chaoyang (CN); Lianying Ji, Beijing (CN)

(73) Assignee: Yingjie Liu, Chaoyang (CN)

( * ) Notice: Subject to any disclaimer, the term of this patent is extended or adjusted under 35 U.S.C. 154(b) by 223 days.

This patent is subject to a terminal disclaimer.

(21) Appl. No.: 14/799,185

(22) Filed: Jul. 14, 2015

(65) Prior Publication Data

US 2015/0317469 A1 Nov. 5, 2015

Related U.S. Application Data

(63) Continuation-in-part of application No. 14/119,885, filed on Nov. 25, 2013, now Pat. No. 9,117,065.

(51) Int. Cl.
*G06F 21/31* (2013.01)
*G06F 21/36* (2013.01)
*H04L 9/32* (2006.01)

(52) U.S. Cl.
CPC ............ *G06F 21/36* (2013.01); *H04L 9/3226* (2013.01); *H04L 9/3228* (2013.01); *H04L 9/3271* (2013.01)

(58) Field of Classification Search
CPC ..... H04L 63/08; H04L 63/083; H04L 67/306; G06F 21/31
USPC ........................ 726/2, 16, 17, 19, 21, 34, 35
See application file for complete search history.

(56) References Cited

U.S. PATENT DOCUMENTS 9,117,065 B2 * 8/2015 Liu ........................ H04L 9/3228
2005/0015345 A1 * 1/2005 Yao ........................ G06Q 20/04
705/64

* cited by examiner

*Primary Examiner* — Joseph P Hirl
*Assistant Examiner* — Kalish Bell
(74) *Attorney, Agent, or Firm* — CBM Patent Consulting, LLC (57) ABSTRACT

An identity authentication system includes a storage unit, a display character set generation unit, a display unit and a password authentication unit. An identity authentication method includes the following steps: generating the dynamic display character sets; inputting a dynamic input code; and comparing the dynamic input code with the user password. This invention can improve the security of identity authentication and is convenient to use.

19 Claims, 9 Drawing Sheets

DYNAMIC INTERACTIVE IDENTITY AUTHENTICATION METHOD AND SYSTEM

This application is a continuation-in-part application of U.S. patent application Ser. No. 14/119,885 which is the U.S. national phase of International Application No. PCT/CN2011/000899 Filed 26 May 2011, the entire content of which is hereby incorporated by reference.

FIELD OF THE INVENTION

The present invention relates to the field of identity authentication, and more particularly, to dynamic interactive identity authentication method and system.

BACKGROUND OF THE INVENTION

There has been a well-known safety barrel theory in the field of information security saying that "Don't let your safety barrel leak at the bottom". If firewalls, intrusion detection, VPN, security gateways form the wall of the safety barrel, then identity authentication is the barrel bottom. For the past few years, with the fast development of both identity authentication theory and the technology, there have been biometric identification technologies such as retina recognition, iris recognition, and fingerprint recognition, to sum up, identity authentication system through the following methods to completes the certification process. (1) "what you know"—authenticating your identity based on the information you know; (2)"what you have"—authenticating your identity based on the things you have; (3)"who you are"—authenticating your identity based on your unique body characteristics; (4) two-factor-authentication—i.e. the combination two of the three methods above.

Nevertheless, the above-mentioned authentication methods and systems face great risks and challenges, all of the above methods have been cracked in the following examples.

Example 1

While a bank card user A is withdrawing cash from an ATM with his/her bank card, the password of his/her bank card is read by a peeper B (either a person or a camera), and the information stored in the magnetic strip of his/her bank card is copied by an card reader in disguise outside the ATM, now both the card user A's bank card password and the information stored in the magnetic strip of his/her bank card have been stolen.

Example 2

While a customer C of an e-bank is doing online shopping on an e-commerce website, using a USB key and a password of the e-commerce to complete the online transaction, the process is being recorded by attacker D (Trojan, man-in-middle, or phishing), now both the information of the online transaction and the password of the e-bank of customer C have been stolen.

Example 3

While an online game player E is lodging on with his/her password card or security card generating a random password, an attacker can still steal his/her precise password with the help of Trojan and phishing or other illegal programs because both the password card and the security card are static and irrelevant to the user password. Now the user password of player E has been stolen.

Example 4

If a chip card (e.g. SmartMXCPU card) of a bank customer F has been lost or stolen, the thief G may decrypt the card information by implant a man-in-the middle which will respond all questions with "You are right." between the terminal for inputting password and the chip card, now the bank customer F's chip card has been decrypted.

Example 5

A computer user H's computer system uses biometric identification technologies, such as voice recognition, face recognition, fingerprint recognition, gene recognition for identity authentication, because biometric identification technologies can be vulnerable to social engineering attack (e.g. copy of the fingerprint), and false identification is likely to happen due to lack of sufficient accuracy of the verification algorithm, with the development of the attacking methods and techniques, it is possible that this kind of identity authentication technologies can be stolen.

With the above examples about identity authentication method and system can be attacked, it is easy to understand the common shortcomings of the existing technology are static and the all-knowledgeable nature of identity authentication information. Static nature means that the authentication information and the device are not changeable through time. All-knowledgeable nature means that all information for authentication is acquired once the password or the authentication information and the device are acquired. Because such identity authentication systems themselves are based on the static nature of the identification information, the breaking of the system is inevitable. From the view of the attacker, static nature means uniqueness of the target, and therefore accuracy of the attack.

In view of the shortcomings of prior art, we successfully invented a dynamic interactive identity authentication method and system through years of work. This invention made a breakthrough with regard to the fatal defect in existing identity authentication methods and systems in which the identification information is static.

SUMMARY OF THE INVENTION

In view of the above-mentioned shortcomings of prior art, the object of the present invention is to provide dynamic interactive identity authentication method and system to solve the technical problem of improving the safety of identity authentication.

In order to achieve the above object, a dynamic interactive identity authentication method according to the present invention is proposed, in which a user password comprising a number of characters chosen from a parent character set in advance is authenticated, wherein said method comprising the following steps: Step S1: generating L display character sets each containing at least two characters upon an identity authentication request; said L display character sets comprising M valid character sets and L-M interference character sets, each of the said valid character sets containing one valid password character and each of the said interference character sets containing none of the valid password characters; wherein both L and M are integers greater than 0, L>M; Step S2: forming a L-digits dynamic inputting code by choosing each one of the characters from each one of said display character sets generated in step S1 and inputting the chosen characters, said dynamic inputting code comprising valid inputting character(s) chosen from said valid character set(s) and interference inputting character(s) chosen from said interference character set(s); and Step S3: comparing said dynamic inputting code with the user password.

The present invention can be further achieved by the following technical measures.

The aforesaid dynamic interactive identity authentication method, wherein, generating a L-digit binary sequence at random based on the user password before generating said L displaying character sets, said binary sequence comprising M valid digit(s) and L-M interference digit(s); said L display character sets being generated based on said binary sequence.

The aforesaid dynamic interactive identity authentication method, wherein said user password is in a form of plaintext; the length of said user password is an integer S which is greater than 0; said L is greater than S; said comparing the dynamic inputting code with the user password is a comparison between the dynamic inputting code and the user password after removing all interference inputting code from the dynamic inputting code, the identity authentication is passed if the result of said comparison is identical.

The aforesaid dynamic interactive identity authentication method, wherein said user password is in a form of plaintext; the length of said user password is an integer S which is greater than 0; said L equals S; said comparing the dynamic inputting code with the user password is a comparison between the dynamic inputting code and the user password after removing any of the characters corresponding to the interference character set both from the dynamic inputting code and the user password, he identity authentication is passed if the result of said comparison is identical.

The aforesaid dynamic interactive identity authentication method, wherein said user password is in a form of plaintext; the length of said user password is an integer S which is greater than 0; said L is less than S; said comparing the dynamic inputting code with the user password is a comparison between the dynamic inputting code and the user password after removing all interference inputting code from the dynamic inputting code and removing the last S-L characters and any of the characters corresponding to the interference character set from the user password, the identity authentication is passed if the result of said comparison is identical.

The aforesaid dynamic interactive identity authentication method, wherein said user password is in a form of ciphertext, and the length of said user password is a fixed value S, S is an integer greater than 0; said L display character sets form S groups of display character set(s), the union set of each group of the display character set(s) is the parent character set; wherein, L is greater than S; said comparing the dynamic inputting code with the user code is a comparison between the user password in ciphertext and a guessing code in ciphertext, said guessing code in ciphertext is obtained by using the method to encrypt the user password to encrypt a guessing code which is obtained by choosing S character(s) from the dynamic inputting code, the identity authentication is passed if the result of said comparison is identical.

The aforesaid dynamic interactive identity authentication method, wherein said user password is in a form of ciphertext, and the length of the user password is an unknown indefinite value R, R is an integer greater than 0, said user password has a maximum allowable length Q, Q is a known integer greater than 1, said L display character sets form Q groups of display character set, the union set of each group of display character set is the parent character set; said L is greater than Q; when comparing the dynamic inputting code with the user password, first make a guess for the length R of the user password in a range between 1 and Q; then choose R characters from the dynamic inputting code to form a guessing code, encrypt the guessing code by the same method to encrypt the user password and obtain a guessing code in ciphertext; and then compare the user password in ciphertext with the guessing code in ciphertext, the identity authentication is passed if the result of said comparison is identical, the identity authentication fails if the result of said comparison is not identical after going through all of the possible guesses.

The aforesaid dynamic interactive identity authentication method, wherein said parent character set comprises numbers, letters, symbols or their combinations.

The present invention also provides a dynamic interactive identity authentication method, in which a user password comprising a number of characters chosen from a parent character set in advance is authenticated, comprising an inputting step, an authenticating step; also a display character set generating step before the inputting step; said display character set generating step generating L display character sets based on the users password which length is S, each display character set contains at least two characters, said L display character sets comprising M valid character set(s) and L-M interference character set(s), each of the said valid character set having one valid password character and each of the said interference character set having none of the valid password characters; wherein both L and M are integers greater than 0, L>M.

The aforesaid dynamic interactive identity authentication method, wherein said user password is encrypted in a form of ciphertext which cannot be decrypted inversely, and the length of the user password is an unknown indefinite value R, R is an integer greater than 0, said user password has a maximum allowable length Q, Q is a known integer greater than 1, said L display character sets form Q groups of display character sets, the union set of each group of display character sets is the parent character set; said L is greater than Q; when comparing the dynamic inputting code with the user password, first make a guess for the length R of the user password in a range between 1 and Q; then choose R characters from the dynamic inputting code to form a guessing code, encrypt the guessing code by the same method to encrypt the user password and obtain a guessing code in ciphertext; and then compare the user password in ciphertext with the guessing code in ciphertext the identity authentication is passed if the result of said comparison is identical, the identity authentication fails if the result of said comparison is not identical after going through all of the possible guesses.

The present invention also provides a dynamic interactive identity authentication method comprising a display character set generating step, an inputting step, and an identity authentication step; in the inputting step which characters to be inputted are decided by the contents of the display character sets generated in the display character set generating step, when the display character set contains a character corresponding password current digit, then the character should be inputted, otherwise any of the characters in that display character set can be inputted.

In order to achieve the above object, a dynamic interactive identity authentication system is proposed according to the present invention, wherein the system comprises: a storage unit for storing a user password comprising a number of characters chosen from a parent character set; a display character set generating unit for generating L display character sets each containing at least two characters after receiving a request for identity authentication, said L display character sets comprising M valid character set(s) and L-M interference character set(s), each of the said valid character set having one valid password character and each of the said interference character set having none of the valid password characters, wherein both L and M are integers greater than 0, L>M; a display unit for displaying said L display character sets; an inputting unit for inputting a number of characters each chosen from each one of the said display character sets to form a dynamic inputting code; and a password authentication unit for receiving the dynamic inputting code from the inputting unit and comparing the dynamic inputting code with the user password.

The present invention can be further achieved by the following technical measures.

The aforesaid dynamic interactive identity authentication system, wherein generating a L-digit binary sequence by display character set generating unit at random based on the users password before generating said L display character sets said binary sequence comprising M valid digit(s) and L-M interference digit(s); said L display character sets being generated based on said binary sequence.

The aforesaid dynamic interactive identity authentication system, wherein said user password is in a form of plaintext; the length of said user password is an integer S which is greater than 0; said L is greater than S; said comparing the dynamic inputting code with the user code is a comparison between the dynamic inputting code and the user password after removing all interference inputting code from the dynamic inputting code, the identity authentication is passed if the result of said comparison is identical.

The aforesaid dynamic interactive identity authentication system, wherein said user password is in a form of plaintext; the length of said user password is an integer S which is greater than 0; said L equals S, said comparing the dynamic inputting code with the user password is an comparison between the dynamic inputting code and the user password after removing any of the characters corresponding to the interference character set both from the dynamic inputting code and the user password, the identity authentication is passed if the result of said comparison is identical.

The aforesaid dynamic interactive identity authentication system, wherein said user password is in a form of plaintext; the length of said user password is an integer S which is greater than 0; said L is less than S; said comparing the dynamic inputting code with the user password is a comparison between the dynamic inputting code and the user password after removing all interference inputting code from the dynamic inputting code and after removing the last S-L characters and any of the characters corresponding to the interference character set from the user password, the identity authentication is passed if the result of said comparison is identical.

The aforesaid dynamic interactive identity authentication system, wherein said system further comprising lock body control unit and lock body, said lock body control unit receiving identity authentication information from the identity authentication unit to control the lock body' lock and unlock.

The aforesaid dynamic interactive identity authentication system, wherein said user password is in a form of ciphertext; and the length of said user password is a known fixed value S, S is an integer greater than 0; said L display character sets form S groups of display character set(s), the union set of each group of the display character set(s) is the parent character set; wherein, L is greater than S; said comparing the dynamic inputting code with the user password is a comparison between the user password in ciphertext and a guessing code in ciphertext, said guessing code in ciphertext is obtained by using the method to encrypt the user password to encrypt a guessing code which is obtained by choosing S characters from the dynamic inputting code, the identity authentication is passed if the result of said comparison is identical.

The aforesaid dynamic interactive identity authentication system, wherein said user password is in a form of ciphertext which cannot be decrypted inversely, and the length of the user password is an unknown indefinite value R, R is an integer greater than 0, said user password has a maximum allowable length Q, Q is a known integer greater than 1; said L display character sets form Q groups of display character sets, the union set of each group of display character set is the parent character set; said L is greater than Q; when comparing the dynamic inputting code with the user password, first make a guess for the length R of the user password in a range between 1 and Q; then choose R characters from the dynamic inputting code to form a guessing code, encrypt the guessing code by the same method to encrypt the user password and obtain a guessing code in ciphertext; and then compare the user password in ciphertext with the guessing code in ciphertext, the identity authentication is passed if the result of said comparison is identical, the identity authentication fails if the results of said comparison are not identical after comparing all possible guessing codes.

The aforesaid dynamic interactive identity authentication system, wherein said system further comprising a functional module which receives identity authentication information from the password authentication unit and perform the function of designated functional unit.

The aforesaid dynamic interactive identity authentication system, wherein said designated functional unit comprising a cash deposit unit, a cash withdrawal unit, a transfer unit or a password changing unit.

The aforesaid dynamic interactive identity authentication system, wherein system further comprising a server having and a client which is in communication connection with the server, said display unit and said inputting unit set up in the client, said storage unit set up in the server, said aid display character set generating unit and password authentication unit set up in client or server.

The aforesaid dynamic interactive identity authentication system, wherein said client is a bank ATM, a POS, a PC or a cell phone.

All in all, the dynamic interactive identity authentication system of the present invention comprises a storage unit, a display character set generating unit, a display unit and an password authentication unit. The dynamic interactive identity authentication method of the present invention comprises a step of generating dynamic display character set; a step of inputting a dynamic inputting code; a step of comparing the dynamic inputting code with the user password.

The present invention has advantages and beneficial effects over prior art. By means of the above technical solutions, the dynamic interactive identity authentication method and system of the present invention can improve the safety of the identity authentication, and are convenient to use. The dynamic interactive identity authentication method and system of the present invention overcome the fatal defect of static nature of the identity authentication information in the existing identity authentication method and system, propose dynamic interactive theory and technology of identity authentication, achieve the object of partial information in the field identity information for authentication, thereby greatly improve the safety of the identity authentication effectively prevent theft of identity authentication information, making social engineering attacks, Trojans and virus completely useless.

DETAILED DESCRIPTION OF THE INVENTION

In order to better explain the technical solutions used in the present invention to achieve the above objects, detailed explanation of the preferred embodiment of the present invention with reference of the accompanying drawings are given below.

Figure 1:
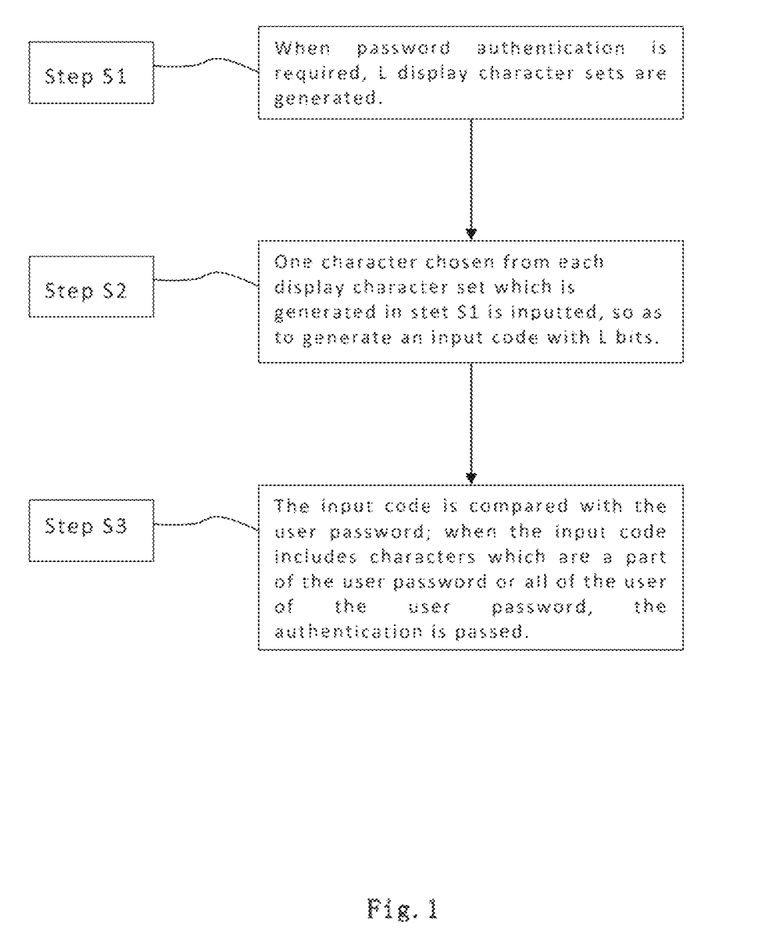
FIG. 1 is a flow chart of the preferred embodiment according the dynamic interactive identity authentication method of the present invention.

Now refer to FIG. 1, which is a flow chart of the preferred embodiment according the dynamic interactive identity authentication method of the present invention. The dynamic interaction identity authentication method of the preferred embodiment according the present invention, in which a user password comprising a number of characters chosen from a parent character set in advance is authenticated, said method comprising the following steps:

Step S1: generating L display character sets each containing at least two characters upon an identity authentication request; said L display character sets comprising M valid character sets and L-M interference character sets, each of the said valid character sets containing one valid password character and each of the said interference character sets containing none of the valid password characters; wherein both L and M are integers greater than 0, L>M;

Step S2: Forming an L-digit dynamic inputting code by choosing a character from each display character set generated in step S1 for input;

Step S2: forming a L-digits dynamic inputting code by choosing each one of the characters from each one of said display character sets generated in step S1 and inputting the chosen characters, said dynamic inputting code comprising valid inputting character(s) chosen from said valid character set(s) and interference inputting character(s) chosen from said interference character set(s);

Step S3: comparing said dynamic inputting code with the user password, the authentication is passed when the inputting code containing part or the entire characters of the user password.

Figure 2:
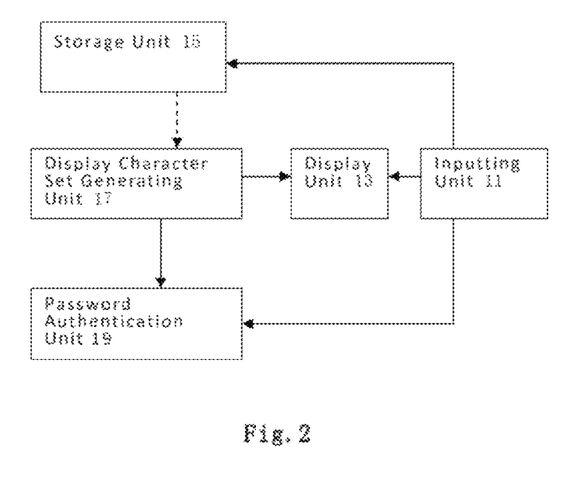
FIG. 2 is a block diagram of the preferred embodiment according the dynamic interactive identity authentication system of the present invention.

Now refer to FIG. 2, which is a block diagram of the preferred embodiment according the dynamic interactive identity authentication system of the present invention. The dynamic interactive identity authentication system of the present invention comprises: a storage unit 15 for storing a user password, said user password is obtained by choosing a number of characters from a parent character set; a display character set generating unit 17, which generates L display character sets each containing at least two characters after receiving a request for identity authentication, said L display character sets comprising M valid character set(s) each having one valid password character and L-M interference character set(s) each having none valid password characters, said both L and M are integers greater than 0, L>M; a display unit 13 for receiving signals from the display character set generating unit 17 and displaying said L display character sets; a inputting unit 11, a user chooses one character from each of said L display character set forming a dynamic inputting code and inputs; a password authentication unit 19 for comparing the dynamic inputting code received from the inputting unit 11 with the user password, the authentication being passed when the dynamic inputting code containing part or entire characters of the user password.

Figure 3:
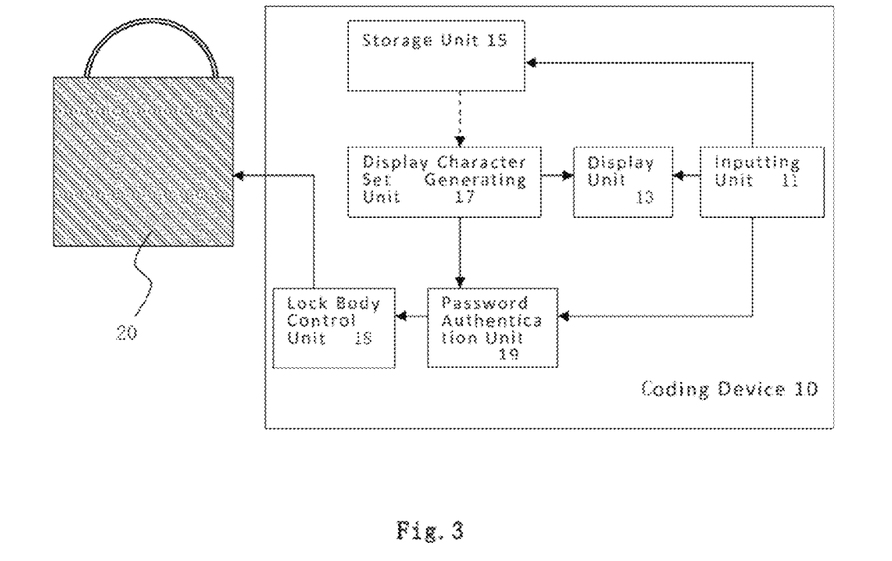
FIG. 3 is a block diagram of the application embodiment for coded lock of the present invention.

Now refer to FIG. 3, which is a block diagram of the application embodiment for a coded lock of the present invention. The coded lock of the application embodiment of the present invention comprises: a coding device 10 and a lock body 20. The coding device 10 comprising a password setting mode and a password authentication mode which can be controlled by a inputting unit 11 to switch between the two modes; the coding device 10 controlling the lock body 20 for locking and unlocking. The coding device 10 comprising a storage unit 15, a display character set generating unit 17, a password authentication unit 19, a lock body control unit 18, a display unit 13 and an inputting unit 11.

When using the coded lock, starting from the password setting mode, a user password having a length of S-digits is set by choosing a number of characters from the parent character set through the inputting unit 11, for example, "IPTH" is this case. The user password which can be in a form of plaintext stores in storage unit 15, the coded lock will switch to password authentication mode after the user password is set.

Figure 4:
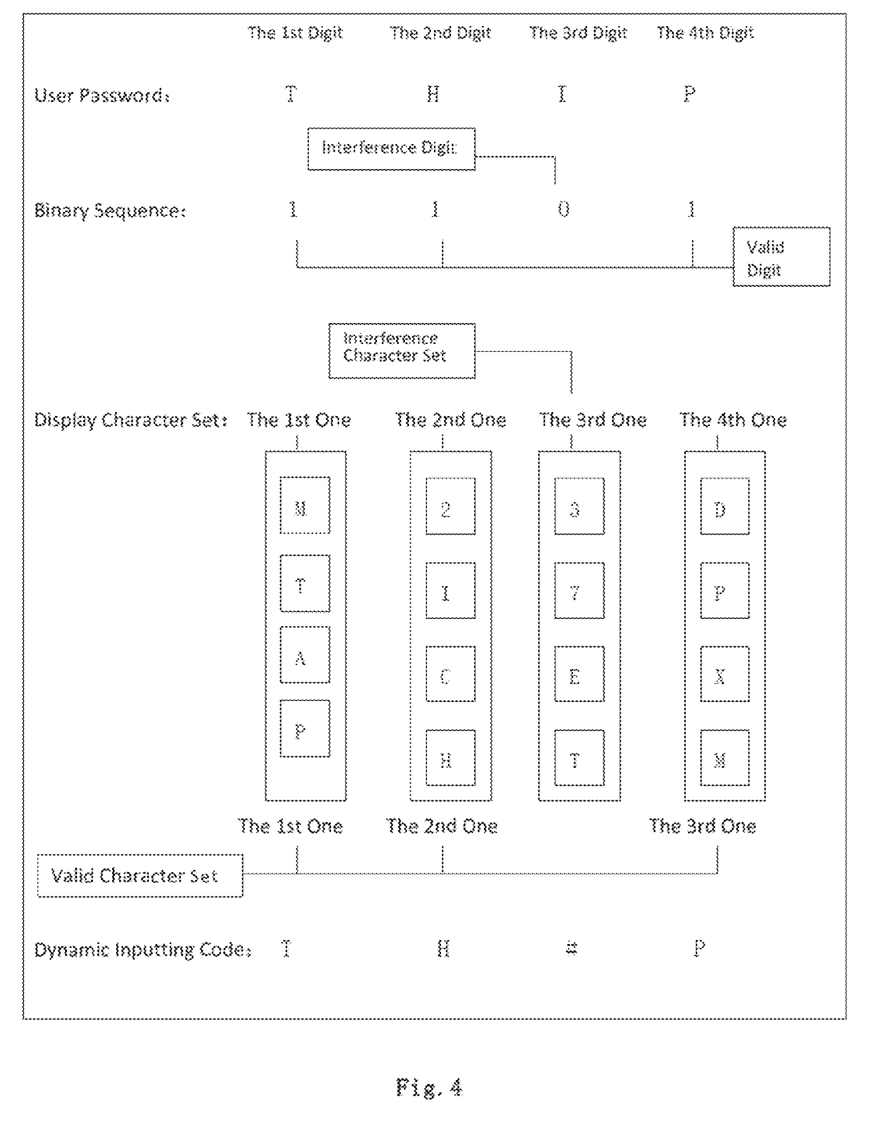
FIG. 4 shows the first configuration of the user password, the display character set and the dynamic inputting code of the coded lock.

Said display character set generating unit 17 generates display character sets as it receives a request for identity authentication, referring to FIG. 4 which shows the first configuration of the user password, the display character set and the dynamic inputting code of the coded lock. As the display character set generating unit 17 receives an identity authentication request, it will first reads the user password "THIP" stored in the storage unit 15 and generates a binary sequence at random having the same length of digits to the user password "THIP", for example, "1101", said binary sequence comprising valid digit(s) represented by "1" and interference digit(s) represented by "0". Next, according to the binary sequence "1101", four display character sets are generated corresponding to the valid digits and the interference digit of the binary sequence, the four display character sets comprises valid character sets (namely the first, second and fourth display character sets) and an interference character set (the third display character set). Each valid character set comprises a corresponding password character and other characters randomly chosen from parent character set and each interference character set does not comprises a corresponding password character. Said "corresponding password character" refers to a password character that corresponds to a display character set that has the same sequence number, i.e., the password character that corresponds to the Nth display character set is the Nth password character. In the above example, the first display character set corresponds to the password character "T", the second display character set corresponds to the password character "H", the third display character set corresponds to the password character "I", and the fourth display character set corresponds to the password character "P". Also in this example, the first display character set comprises characters "M", "T", "A", and "P", the second display character set comprises characters "2", "I", "C", and "H", the third display character set comprises characters "3", "7", "E", and "T", and the fourth display character set comprises characters "D", "P", "X", and "M". Wherein each display character set comprises at least two characters, the characters included in each display character set are randomly changed during each identity authentication.

Said display 13 displays the above 4 display character sets in order or simultaneously.

A user chooses one character from each of the above display character sets for input through the input unit 11 to form a dynamic inputting code. When the user is inputting the password, instead of making a distinction between a valid character set and an interference character set, he/she only needs to choose the password character from the display character set if it contains the corresponding password character, and choose any of the characters from the display character set if it does not contain the corresponding password character. In the above example, the dynamic inputting code is "TH#P", in which "#" means any of the characters "3", "7", "E", and "T" from the third display character set, i.e., the correct inputting code can be any of the "TH3P", "TH7P", "THEP", or "THTP".

Said identity authentication unit 19 receives the dynamic inputting code to make a comparison with the user password. The comparison is made after removing the characters from both the user password and the dynamic inputting code which are in positions corresponding to that of the interference digit in the binary sequence. If the remaining characters from the dynamic inputting code and the corresponding user password are found identical, then the identity authentication is passed. If not, then the identity authentication is failed. In the above example, according to the binary sequence "1101", the user code "THIP" becomes "THP" and the input code "TH#P" becomes "THP" after removing the character in the position corresponding to the interference digit in the binary sequence. The identity authentication is then passed.

Said lock control unit 18 receives identity authentication information from the identity authentication unit 19. The lock control unit 18 disengage (or engage) the lock body 20 when the identity authentication is passed.

In practical application, the binary sequence, the display character sets, and the dynamic inputting code are changed randomly during each identity authentication. For example, the randomly generated binary sequence can be "1101", "0011", "1000" or "1110", thus the correct inputting codes are "TH#P", "##IP", "T###" or "THI#".

The above-mentioned first method to generate the display character sets of coded lock (see FIG. 4) can be briefly described as "substitution type", i.e., one or more of the password character(s) is/are substituted by one or more interference character(s).

Figure 5:
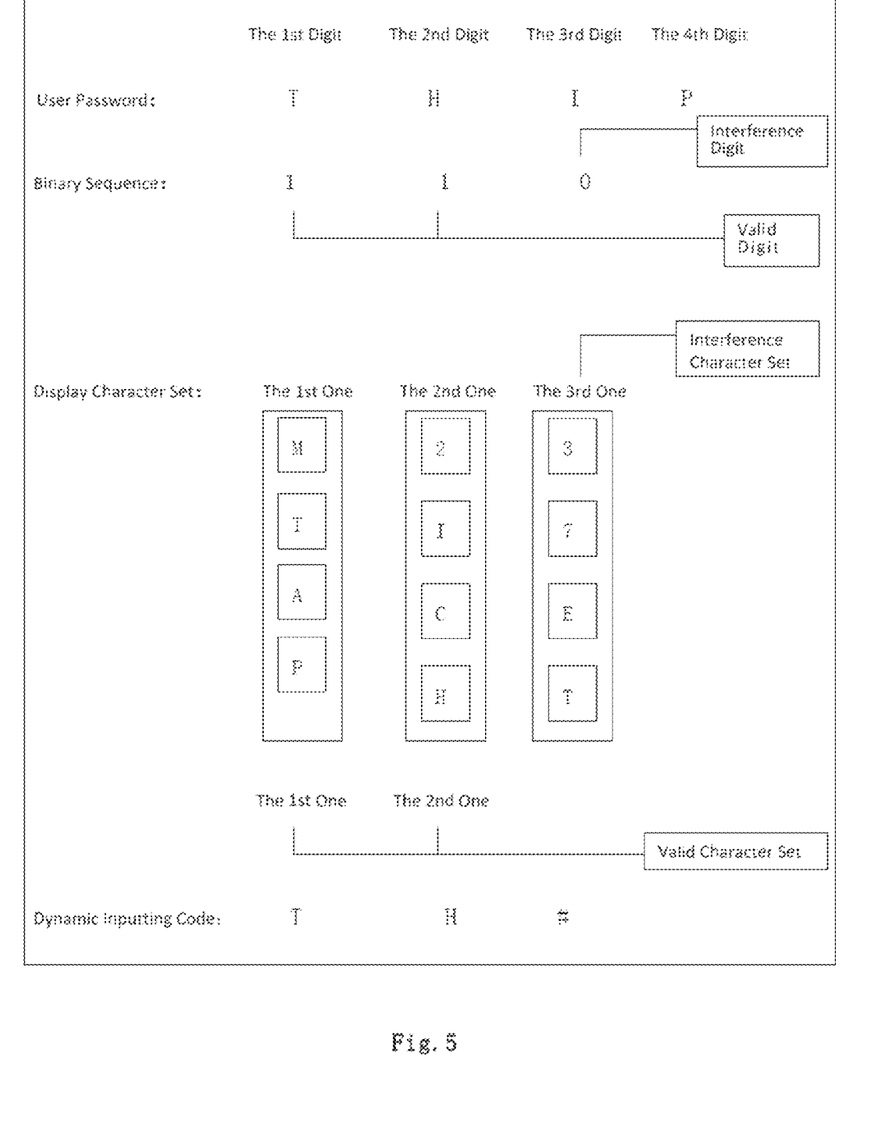
FIG. 5 shows the second configuration of the user password, the display character sets and the dynamic inputting code of the coded lock.

Now refer to FIG. 5, which shows the second configuration of the user password, the display character sets and the dynamic inputting code of the coded lock. The second method to generate the display character sets can be briefly described as "substitution and omission type", i.e., one or more of the password character(s) is/are substituted by one or more interference character(s) while at the same time one or more of the password character(s) is/are omitted. The second method to generate the display character sets is similar to the first method to generate the display character sets excepted the digit number of the binary sequence, the number of the display character sets and the number of the dynamic inputting code generated by the display character set generating unit 17 are less than the digit number of the user password. For example, in FIG. 5, the binary sequence generated is "110" corresponding to three display character sets and a three digit dynamic inputting code. In FIG. 5, the first display character set comprises characters "M", "T", "A", and "P", the second display character set comprises characters "2", "I", "C", and "H", and the third display character set comprises characters "3", "7", "E", and "T"; the dynamic inputting code is "TH#". Said identity authentication unit 19 receives the dynamic inputting code to make a comparison with the user password, the comparison is made after removing the last digit(s) character(s) of the user password according to the length of the binary sequence and after removing the characters from both the user password and the dynamic inputting code which are in positions corresponding to that of the interference digit in the binary sequence. If the remaining characters from the dynamic inputting code and the corresponding user password are found identical, then the identity authentication is passed. If not, then the identity authentication is failed. In this example, according to the binary sequence "110", the user code "THIP" becomes "TH" after removing the last character and the interference character in the position corresponding to the interference digit in the binary sequence, and the dynamic inputting code "TH#" becomes "TH" after removing the interference character in the position corresponding to the interference digit in the binary sequence, the compared characters are identical, then the identity authentication is passed. The binary sequence are changed randomly during each identity authentication. For example, the binary sequence can be "10", "001", "100" or "101". Thus the correct inputting codes are "T#", "##I", "T##" or "T#I" accordingly.

Figure 6:
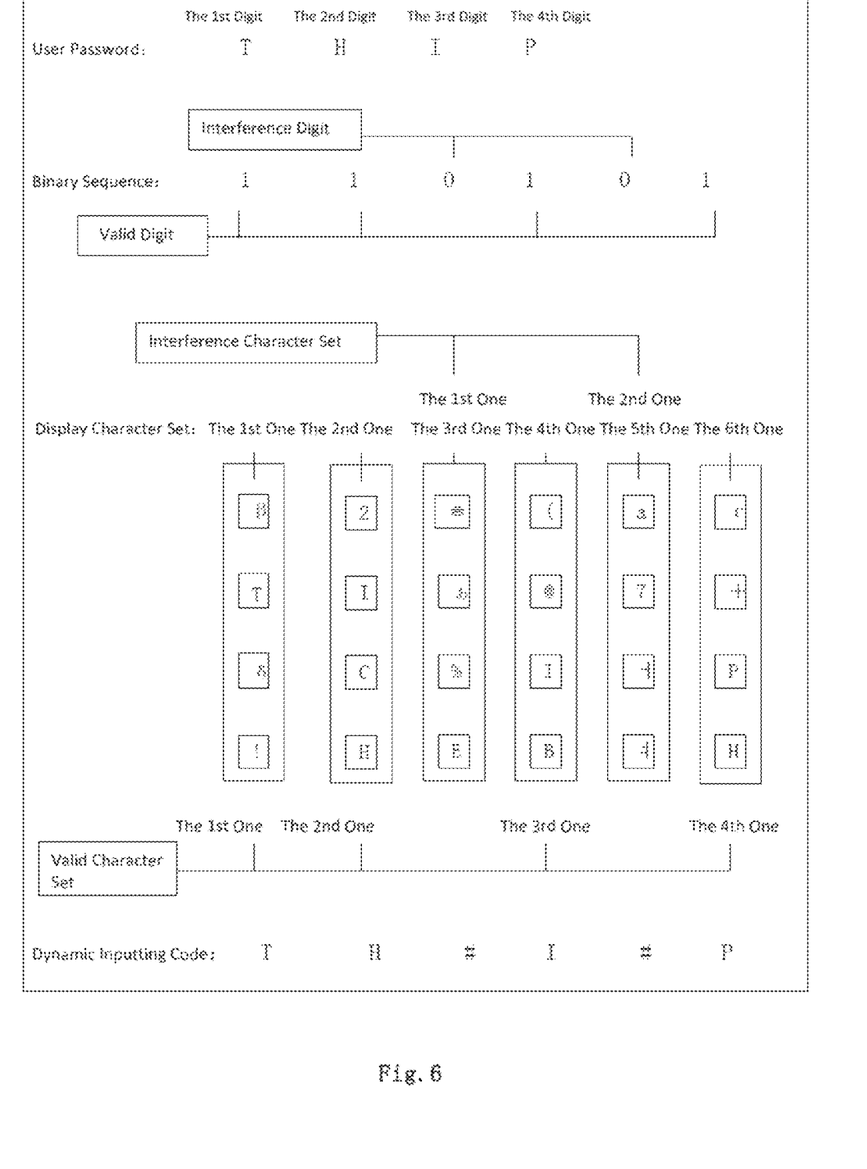
FIG. 6 shows the third configuration of the user password, the display character sets and the dynamic inputting code of the coded lock.

Now refer to FIG. 6, which shows the third configuration of the user password, the display character sets and the dynamic inputting code of the coded lock. The third method can be briefly described as "insertion type", i.e., interference character(s) is/are inserted in the password characters and all characters of the user password are kept. The third method to generate the display character sets is similar to the first method to generate the display character sets excepted the binary sequence, the display character sets, the inputting code, and the method of authentication.

Referring to FIG. 3 and FIG. 6, as the display character set generating unit 17 receives an identity authentication request, it first reads the user password "THIP" stored in storage unit 15 and generates a binary sequence at random based on the user password "THIP" said binary sequence has more numbers of digits than that of the user password, for example, "110101", which binary sequence comprising valid digit(s) represented by "1" and interference digit(s) represented by "0". In this example, the first digit, the second digit, the fourth digit and the sixth digit are valid digits and the third digit and the fifth digit are interference digits. The binary sequence comprises at least one interference digit. Next, six display character sets are generated according to the above binary sequence "110101", in which the first, second, fourth, and sixth character sets are valid character sets and the third and the fifth character sets are interference character sets. Each valid character set contains the corresponding password character, and each interference character set contains none of the corresponding password character. In this example, said "corresponding password character" refers to a password character that corresponds to a display character set that has the same sequence number, i.e., the password character that corresponds to the Nth display character set is the Nth password character, while, the password character that corresponds to the Pth interference character set is the password character that comes just after the password character that corresponds to the valid character set that comes just before the Pth interference character, in this example, the password characters that correspond to the first through the sixth display character sets are "T", "H", "I", "I", "P", and "P". Again in this example, the first character set comprises "β, T, δ, !", the second character set comprises "2, I, C, H", the third character set comprises "≡, あ, %, E", the fourth character set comprises "(, @, I, B", the fifth character set comprises "a, 7, ㅓ, ㅕ" and the sixth character set comprises "r, +, P, H".

Said display unit 13 displays above six display character sets in order (or simultaneously).

A user chooses one character from each of the above display character sets for input through the inputting unit 11 to form an inputting code. When the user is inputting the password, he/she only needs to choose the password character from the display character set if it contains the corresponding password character, and choose any of the characters from the display character set if it does not contain the corresponding password character. In this example the correct inputting code is "TH#I#P", in which "#" represents any of the characters from the interference character set, i.e., the correct inputting code can be any of the following: "TH≡IaP", "THあI7P", "TH%IㅓP", or "TH&IㅕP", and so on.

Said password authentication unit 19 receives the inputting code to make a comparison with the user password. The comparison is made after removing the characters which are in positions corresponding to that of the interference digits in the binary sequence from the inputting code. If the remaining characters from the inputting code and the corresponding user password are found identical, then the identity authentication is passed. If not, then the identity authentication is failed. In the above example, according to the binary sequence "110101", the inputting code "TH#I#P" becomes "THIP" after removing the character in the positions corresponding to the interference digits in the binary sequence, which is identical to the user password "THIP" (including the order arrangement of the characters). The identity authentication is then passed.

Said lock control unit 18 receives identity authentication information from the identity authentication unit 19. The lock control unit 18 disengage (or engage the lock) the lock body 20 when the identity authentication is passed.

In practical application, the binary sequence changes randomly during each identity authentication. For example, during previous identity authentication, the randomly generated binary sequence is "110101# corresponding to the correct inputting code "TH#I#P"; in the present identity authentication, the randomly generated binary sequence is "11101# corresponding to the correct inputting code "THI#P"; and the binary sequence can be "01111" in the next identity authentication corresponding to the correct inputting code "#THIP".

Based on the above-mentioned coded lock and the three methods of generating display character sets (FIG. 3-FIG. 6), it can be seen that when a user is inputting a password, he/she shall decide what to input according to the displayed characters by display unit 13, when the displayed character set contains the corresponding password character, the user should input that password character, or the user can input any of the characters arbitrarily. Because only a legitimate user is able to determine if the inputting digit is a valid digit, any illegal users or monitor programs cannot judge correctly. A password peeper (e.g. a person, a camera, or an a Trojan) still cannot decide which digits are valid and which are interference even if the peeper has obtained the display character sets and the inputting code of the legal user completely. Because of the randomly generated display character sets by the display character set generating unit 17, even if the user's inputting has been observed once or more than once, the observer still cannot fully obtain the information about the user password. On the other hand, a legitimate user can input correctly as long as he/she can remember the user password. The present invention can improve safety of the identity authentication and is easy to use.

Figure 7:
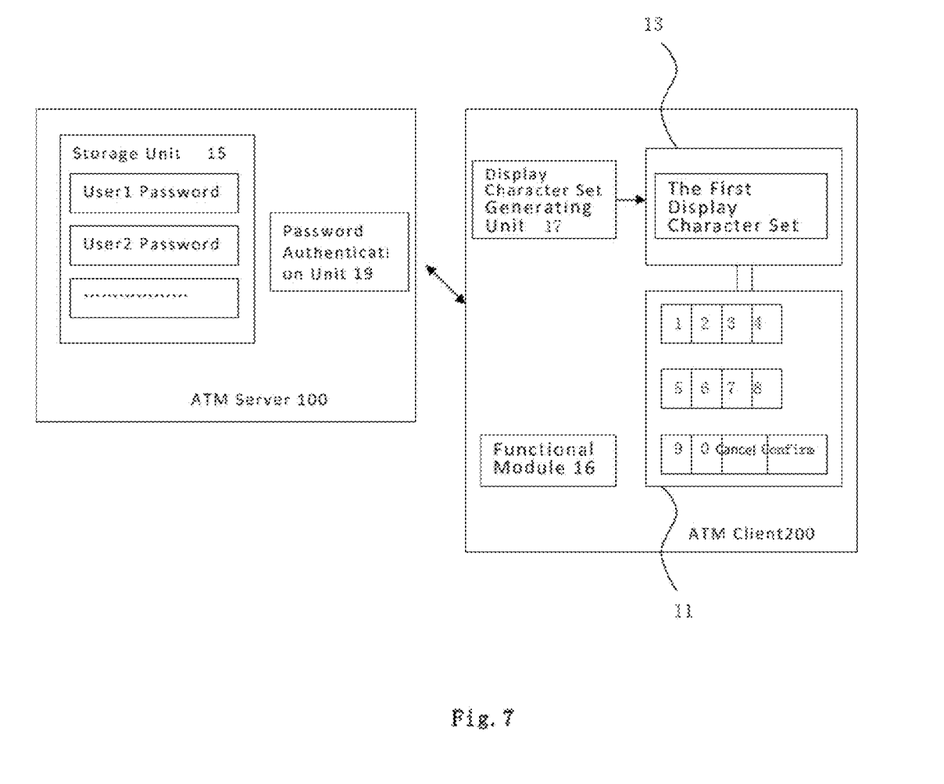
FIG. 7 is a block diagram of another application embodiment for identity authentication system of a bank ATM.
Figure 8:
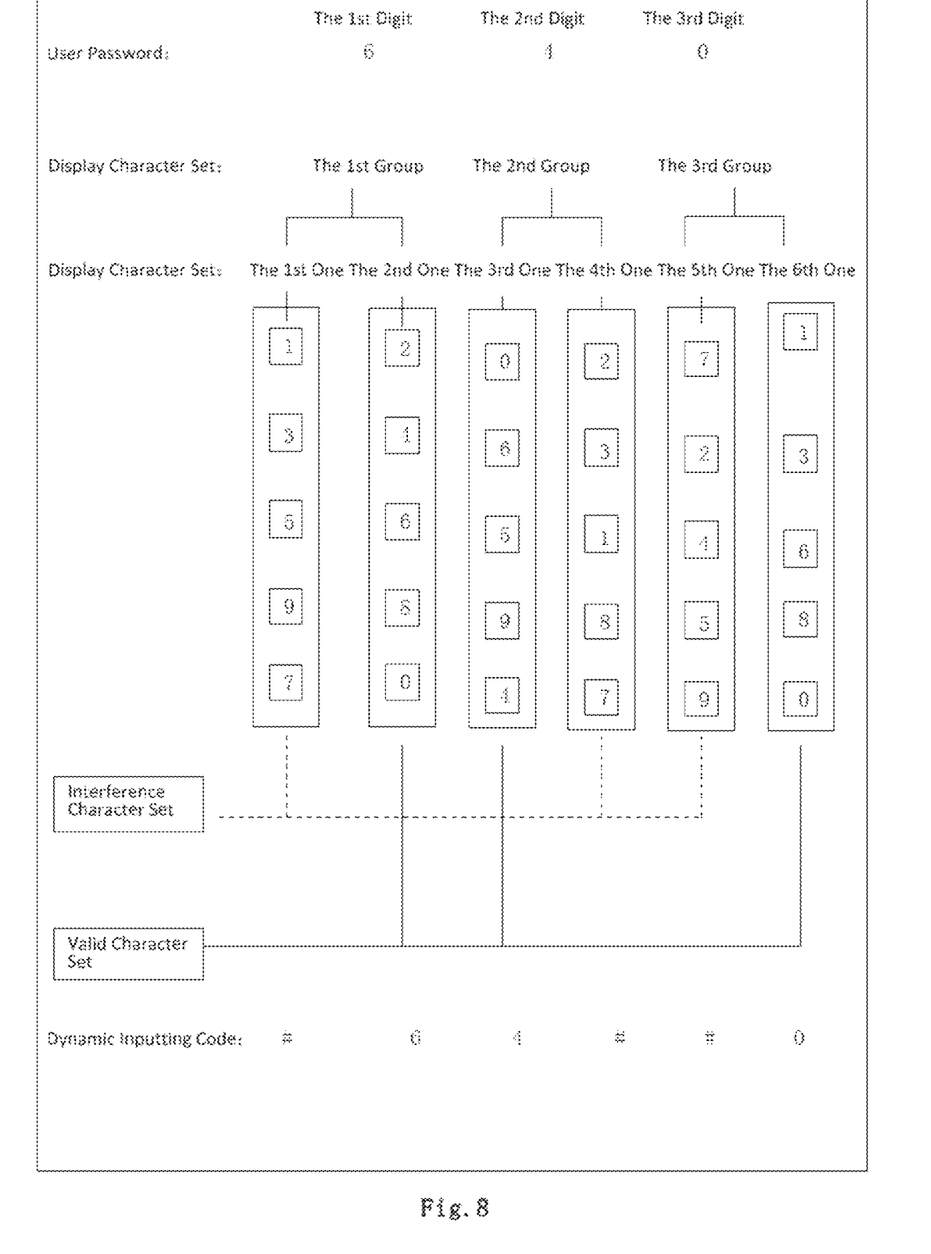
FIG. 8 shows the configuration of the user password, the display character sets and the dynamic inputting code of the identity authentication system of a bank ATM.

Referring to FIGS. 7 and 8, in which FIG. 7 is the block diagram of another application embodiment for identity authentication system of a bank ATM and FIG. 8 shows the configuration of the user password, the display character sets and the dynamic inputting code of the identity authentication system of a bank ATM.

The bank ATM identity authentication system comprises a server 100 and a client 200 having communicating connection with the server 100. The client 100 can be, for example an automated teller machine (ATM).

Said server 100 comprises a storage unit 15 and a password authentication unit 19. In other embodiments, said password authentication unit 19 can be set at the client 200. Said storage unit 15 is used to store the user password set by the user during registration or a changed user password, the length of the user password is a fixed value S, S is a natural number greater than 0. The user password is in a form of ciphertext. In this example, the user password is "640" comprising three numbers "6", "4" and "0" chosen from a parent character set comprising figures 0, 1, 2, 3, 4, 5, 6, 7, 8, and 9. The parent character set is not limited by this example, in other embodiments, the parent character set can comprising printed characters such as numbers, letters and symbols, said letters can come from any of the English alphabet, French alphabet, Japanese alphabet, Korean alphabet, Russian alphabet, Greece alphabet or their combinations, said symbols comprise common functional symbols on a computer keyboard, for example, "@, *, (, & ¥, $, 《, 》, <, +, -," and so on.

Said client 200 comprises a display unit 13, an input unit 15, a display character set generating unit 17, a password authentication unit 19 and a functional module 16. In other embodiments, the display character set generating unit 17, the password authentication unit 19 can be set at the server 100.

When a user requests identity authentication (e.g. by inserting a bank card, inputting an account number), the display character set generating unit 17 receives the identity authentication request. The display character set generating unit 17 will first read the user information and the user password information stored in the storage unit 15 of the server 200, said user password information includes the length of the user password and the user password in ciphertext; and then L display character sets are generated based on the length of user password, said L display character sets can be divided into S groups display character sets. At least one of the said S groups display character sets includes at least two display character sets in which one of them is a valid character sets and the others are interference character sets. The union set of each group of the display character set of said S groups display character sets includes all of the characters of the parent character set. In FIG. 8, the length of the user password is "3" and 6 display character sets are generated accordingly in which the first and the second display character sets form the first group, the third and the fourth display character sets form the second group, and the fifth and the sixth display character sets form the third group. The first display character set includes "1, 3, 5, 9, 7" and the second display character set includes "2, 4, 6, 8, 0", the union set of the first and the second display character sets is the parent character set. The third display character set includes "0, 6, 5, 9, 4" and the fourth display character set includes "2, 3, 1, 8, 7", the union set of the third and the fourth display character sets is the parent character set. The fifth display character set includes "7, 2, 4, 5, 9" and the sixth display character set includes "1, 3, 6, 8, 0", the union set of the fifth and the sixth display character sets is also the parent character set.

Said display unit 13 displays the above L display character sets in order or simultaneously.

A user chooses one character from each of above display character sets for input through the input unit 11 to form a dynamic inputting code. When the user is inputting the password, he/she only needs to choose the password character from the display character set if it contains the corresponding password character, and choose any of the characters from the display character set if it does not contain the corresponding password character. In this example the dynamic inputting code is "#64##0" in which "#" represents any of the characters in the corresponding display character set, i.e., there can be a plural of correct dynamic inputting codes in this example, for example, 164270, 364320, 564140, 964850, 764790, and so on.

Said password authentication unit 19 receives the dynamic code and compares it with the user password. During the comparison, first, a guessing code is formed by choosing S characters from the dynamic inputting code, then the guessing code encrypted by the same way of encrypting the user password to obtain a guessing code in ciphertext, then the guessing code in ciphertext is compared with the user code in ciphertext, the identity authentication is passed if the guessing code in ciphertext matches the user code in ciphertext meaning correct input. The guessing code can have a plural of combinations. All possible combinations of the guessing code in ciphertext are compared with the user password in ciphertext. The identity authentication fails if none of combinations of the guessing code in ciphertext matches the user password in ciphertext meaning wrong inputting, and the authentication is finished. Supposing the inputting code is "164270", and the guessing code has 20 combinations such as "270", "470", "420", "620", "640", "642", "120", "140", "142", "160", "162", "164", etc. The identity authentication is passed as long as one of the guessing code in ciphertext matches the user password in ciphertext and the identity authentication fails if no match is found after going through all of the guessing codes in ciphertext. It is optional to use a strong authentication strategy during the password guessing process, i.e., even if the guessing code in ciphertext matches the stored user password in ciphertext, the inputting process by the user has to be examined. Because, at this point, it is possible to know the user password, the authentication fails if the user fails to input a character which has been correctly input in the same position repeatly before. For example, "6" is the first character of the user password. Supposing both the second and the third display character sets contain the character "6", the user, however, chooses the "6" in the third display character set instead of choosing the "6" in the second display character set, in this case the user's input is considered wrong and the authentication fails.

Said functional module 16 receives the identity authentication information from password authentication unit 19 and perform the function unit, such as deposit unit, withdrawal unit, transfer unit or password changing unit, designated by the user when the identity authentication is passed.

Above-mentioned bank ATM identity authentication system, when the user is inputting the password, his/her shall decide what to input according to the displayed characters by display unit 13, when the displayed display character set contains the corresponding password character, the user should input that password character, or the user can input any of the characters arbitrarily. Because only a legitimate user is able to determine if the inputting digit is a valid digit, any illegal user or monitor program cannot judge correctly. A password peeper (e.g. a person, a camera or a Trojan, etc.) still cannot decide which digits are valid and which are interference even if the peeper has obtained the display character sets and the inputting code of the legal user completely. Because of the randomly generated display character sets by the display character set generating unit 17, even if the user's inputting has been observed once or more than once, the observer still cannot fully obtain the information about the user password. On the other hand, a legitimate user can input correctly as long as he/she can remember the user password. The present invention can improve the safety of identity authentication and is easy to use.

Figure 9:
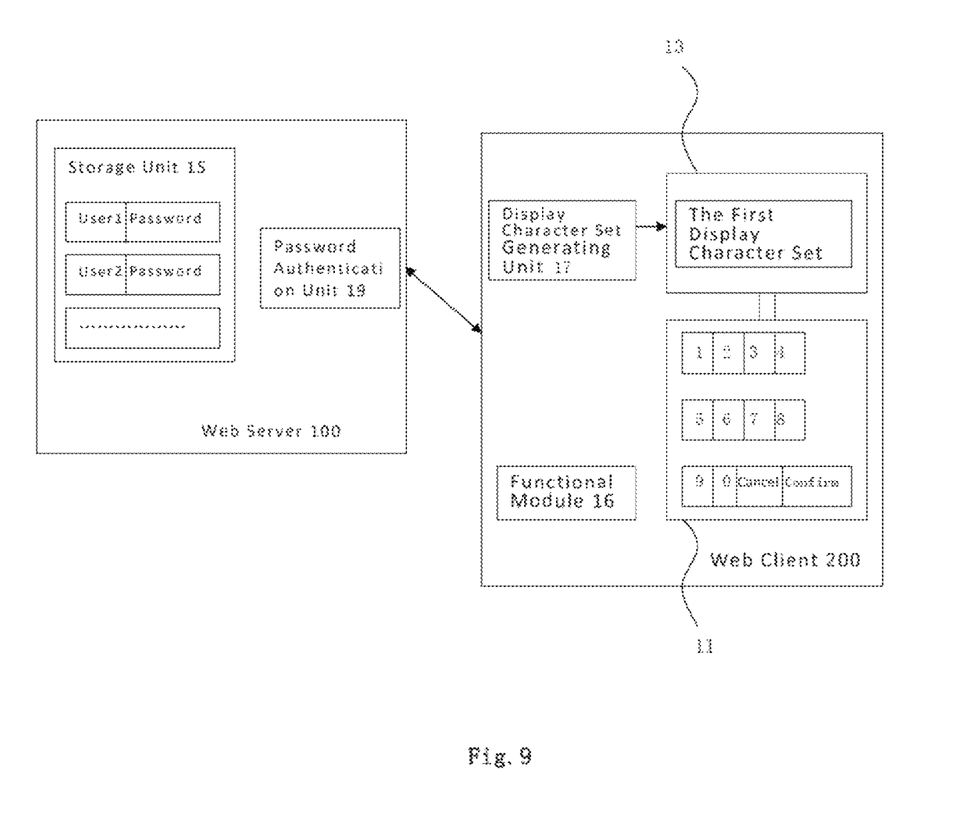
FIG. 9 shows a block of an application embodiment for a Web application authentication system.
Figure 10:
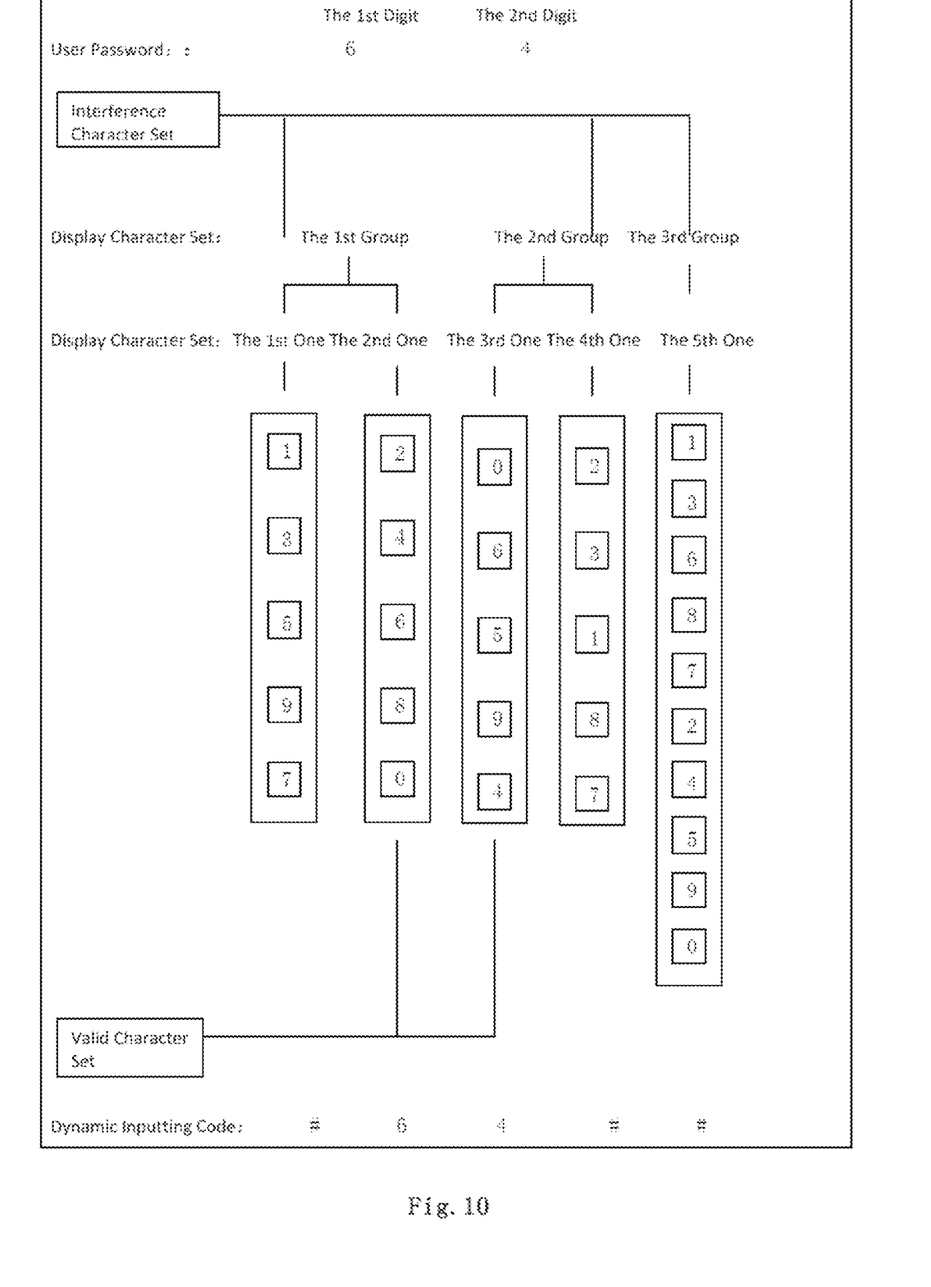
FIG. 10, shows the configuration of the user password, the display character sets and the dynamic inputting code of the Web application authentication system.

Please refer to FIGS. 9 and 10, FIG. 9 is a block of another application embodiment for a Web application authentication system according to the present invention, and FIG. 10, shows the configuration of the user password, the display character sets and the dynamic inputting code of the Web application authentication system.

The Web application identity authentication system comprises a server 100 and a client 200 having a communication connection with the server 100. The client 200, for example, can be a PC or a mobile phone.

Said server 100 comprises a storage unit 15 and a password authentication unit 19. In other embodiments, said password authentication unit 19 can be set at the client 200.

Said storage unit 15 stores multiple users and user passwords corresponding to the user. The length of the user password is an unknown indefinite value R,R is an integer greater than 0; The maximum allowable length of the user password is Q, Q is a natural number equal to or greater than 1, i.e., the lengths of passwords of different users can be different, such as 3, 5, 6, 8, or 15 digits, etc. Here in this example, supposing Q=3, i.e., the length of a user password can be any of 1, 2, or 3. Said user password is in a form of ciphertext and only the legitimate user knows the actual length R of the user password. The user password cannot be obtained from the storage unit 15 and others. In this example, the user password is formed with numbers "6" and "4" chosen from a parent character set comprising figures 0, 1, 2, 3, 4, 5, 6, 7, 8, and 9. The parent character set is not limited by this example, the parent character set can comprising print characters such as numbers, letters and symbols; said letters can come from any of the English alphabet, French alphabet, Japanese alphabet, Korean alphabet, Russian alphabet, Greece alphabet or their combinations, said symbols includes common functional symbols on a computer keyboard, for example, "@, *, (, & ¥, $, 《, 》, <, +, −," and so on.

Said client 200 comprises a display unit 13, an inputting unit 15, a display character set generating unit 17 and functional module 16. In other embodiments, the display character set generating unit 17 can be set in the server 100.

When a user requests identity authentication (e.g. clicking lodge on authentication request), said display character set generating unit 17 receives the identity authentication request. The display character set generating unit 17 first reads the user information and the user password information stored in the storage unit 15 of the server 200, said user password information includes the maximum allowable length Q of the user password and the user password in ciphertext; L display character sets are generated according to the maximum allowable length of the user password; said L display character set can be divided into Q groups display character sets. At least one display of the said Q groups display character sets includes at least two display character sets in which one of them is a valid character sets and the others are interference character sets. The union set of each group of the display character set of said Q groups of display character sets is the parent character set. Referring to FIG. 10, the maximum allowable length Q of the user password is "3" and 5 display character sets are generated accordingly in which the first and the second display character sets form the first group, the third and the fourth display character sets form the second group, and the fifth display character sets form the third group; the first display character set includes "1, 3, 5, 9, 7" and the second display character set includes "2, 4, 6, 8, 0", the union set of the first and the second display character sets contains all of the characters in the parent character set; the third display character set includes "0, 6, 5, 9, 4" and the fourth display character set includes "2, 3, 1, 8, 7", the union set of the third and the fourth display character contains all of the characters in the parent character set; the fifth display character set includes all of the characters "0, 1, 2, 3, 4, 5, 6, 7, 8, 9" contained in the parent character set.

Said display unit 13 displays the above L display character sets in order or simultaneously.

The user chooses one character from each of the above display character sets for input through the inputting unit 11 to form a dynamic inputting code. When the user is inputting the password, instead of making a distinction between a valid character set and an interference character set, he/she only needs to choose the password character from the display character set if it contains the corresponding password character, and choose any of the characters from the display character set if it does not contain the corresponding password character. In this example, the dynamic inputting code is "#64##" in which "#" represents any of the characters in the corresponding displaying character set, i.e., there can be multiple correct dynamic inputting codes, for example, 16421, 36430, 56417, 96483, 76472 and so on.

Said password authentication unit 19 receives the dynamic inputting code and compares it with the user password. During comparison, because the user password is in ciphertext and the length of the user password is unknown, thus first assume the length R of the user password is 1, 2 . . . Q successively, choose R characters from the dynamic inputting code to form a guessing code, and then encrypt the guessing code in the same way the user password is encrypted to obtain a guessing code in ciphertext, then compare the guessing code in ciphertext with the user password in ciphertext, the identity authentication is passed if they match. There can be multiple guessing codes which can have different lengths or different character combinations, all possible combinations of the guessing code in ciphertext are compared with the user password in ciphertex, the identity authentication fails if none of combinations of the guessing code in ciphertext matches the user password in ciphertext meaning wrong inputting. It is optional to use a strong authentication ATM strategy during the password guessing process, i.e., even if the guessing code in ciphertext matches the stored user password in ciphertext, the inputting process by the user has to be examined. Because, at this point, it is possible to know the user password, the authentication fails if the user fails to input a character which could be correctly input in the same position repeatly before. For example, "6" is the first character of the user password supposing both the second and the third display character sets contain the character "6", the user, however, chooses the "6" in the third display character set instead of choosing the "6" in the second display character set, in this case the user's input is considered wrong and the authentication fails.

Said functional module 16 receives the identity authentication information from password authentication unit 19 and perform the user designated functional units, such as webpage browsing unit, mailbox logging in unit, online shopping unit, online bank transfer unit, password changing unit, etc., when the identity authentication is passed.

Based on the above-mentioned Web application identity authentication system, it can be seen that when a user is inputting a password, he/she shall decide what to input according to the displayed characters by display unit 13, when the displayed character set contains the corresponding password character, the user should input that password character, or the user can input any of the characters arbitrarily. Because only a legitimate user is able to determine if the inputting digit is a valid digit, any illegal users or monitor programs cannot judge correctly. A password peeper (e.g. a person, a camera, or an a Trojan. etc.) still cannot decide which digits are valid and which are interference even if the peeper has obtained the display character sets and the inputting code of the legal user completely. Because of the randomly generated display character sets by the display character set generating unit 17, even if the user's inputting has been observed once or more than once, the observer still cannot fully obtain the information about the user password. On the other hand, a legitimate user can input correctly as long as he/she can remember the user password. The present invention can improve safety of the identity authentication and is easy to use.

The dynamic interactive identity authentication method and system can be used by a bank ATM, a computer, a tablet, a smartwatch, a smartphone or a cell phone.

In the above embodiments, the display character sets are shown by way of images, but the showing method is not limited, they also can be shown audibly; the inputting method is not limited to keyboard or touch screen input, it also can be voice input.

Although the preferred embodiments of the present invention are described herein, they are not deemed to limit the scope of the invention. Any obviously changes and equivalent modifications based on the description and the claims are still within the scope of the present invention.

What is claimed is:

1. A dynamic interactive identity authentication system, characterized in that the system comprises:
    a storage unit for storing a user password comprising a number of characters chosen from a parent character set;
    a display character set generating unit for generating L display character sets each containing at least two characters after receiving a request for identity authentication, said L display character sets comprising M valid character set(s) and L-M interference character set(s), each of the said valid character set having one valid password character and each of the said interference character set having none of the valid password characters, wherein both L and M are integers greater than 0, L>M;
    a display unit for displaying said L display character sets;
    an inputting unit for inputting a number of characters each chosen from each one of the said L display character sets to form a dynamic inputting code; and
    a password authentication unit for receiving the dynamic inputting code from the inputting unit and comparing the dynamic inputting code with the user password.

2. The dynamic interactive identity authentication system of claim 1, characterized in generating a L-digit binary sequence by display character set generating unit at random based on the user password before generating said L display character sets, said binary sequence comprising M valid digit(s) and L-M interference digit(s); said L display character sets being generated based on said binary sequence.

3. The dynamic interactive identity authentication system of claim 1, characterized in that said user password is in a form of plaintext; the length of said user password is an integer S which is greater than 0; said L is greater than S; said comparing the dynamic inputting code with the user password is a comparison between the dynamic inputting code and the user password after removing all interference inputting code from the dynamic inputting code, the identity authentication is passed if the result of said comparison is identical.

4. The dynamic interactive identity authentication system of claim 1, characterized in that said user password is in a form of plaintext; the length of said user password is an integer S which is greater than 0, said L equals S; said comparing the dynamic inputting code with the user password is a comparison between the dynamic inputting code and the user password after removing any of the characters corresponding to the interference character set both from the dynamic inputting code and the user password, the identity authentication is passed if the result of said comparison is identical.

5. The dynamic interactive identity authentication system of claim 1, characterized in that said user password is in a form of plaintext; the length of said user password is an integer S which is greater than 0, said L is less than S; said comparing the dynamic inputting code with the user password is a comparison between the dynamic inputting code and the user password after removing all interference inputting code from the dynamic inputting code and after removing the last S-L characters and any of the characters corresponding to the interference character set from the user password, the identity authentication is passed if the result of said comparison is identical.

6. The dynamic interactive identity authentication system of claim 1, characterized in that said user password is in a form of ciphertext, the length of said user password is a known fixed value S, S is an integer greater than 0; said L display character sets form S groups of display character set(s), the union set of each group of the display character set(s) is the parent character set; wherein, L is greater than S; said comparing the dynamic inputting code with the user password is a comparison between the user password in ciphertext and a guessing code in ciphertext, said guessing code in ciphertext is obtained by using the method to encrypt the user password to encrypt a guessing code which is obtained by choosing S characters from the dynamic inputting code, the identity authentication is passed if the result of said comparison is identical, the identity authentication fails if the results of said comparison are not identical after comparing all possible guessing codes.

7. The dynamic interactive identity authentication system of claim 1, characterized in that said user password is in a form of ciphertext, and the length of the user password is an unknown indefinite value R, R is an integer greater than 0, said user password has a maximum allowable length Q, Q is a known integer greater than 1; said L display character sets form Q groups of display character sets, the union set of each group of display character sets is the parent character set; said L is greater than Q; when comparing the dynamic inputting code with the user password, first make a guess for the length R of the user password in a range between 1 and Q; then choose R characters from the dynamic inputting code to form a guessing code, encrypt the guessing code by the same method to encrypt the user password and obtain a guessing code in ciphertext; and then compare the user password in ciphertext with the guessing code in ciphertext, the identity authentication is passed if the result of said comparison is identical, the identity authentication fails if the results of said comparison are not identical after comparing all possible guessing codes.

8. The dynamic interactive identity authentication system of claim 7, characterized in that said system further comprising a functional module which receives identity authentication information from the password authentication unit and performs the function of designated functional unit.

9. The system for dynamic interactive identity authentication of claim 8, characterized in that said designated functional unit comprising a cash deposit unit, a cash withdrawal unit, a transfer unit or a password changing unit.

10. A dynamic interactive identity authentication system comprises a server-side and client-side(s) which is in communication connection with the server-side, characterized in that the system comprises:
    a storage unit for storing a user password comprising a number of characters chosen from a parent character set;
    a display character set generating unit for generating L display character sets each containing at least two characters after receiving a request for identity authentication, said L display character sets comprising M valid character set(s) and L-M interference character set(s), each of the said valid character set having one valid password character and each of the said interference character set having none of the valid password characters, wherein both L and M are integers greater than 0, L>M;

a display unit for displaying said L display character sets;
an inputting unit for inputting a number of characters each chosen from each one of the said L display character sets to form a dynamic inputting code; and
a password authentication unit for receiving the dynamic inputting code from the inputting unit and comparing the dynamic inputting code with the user password,
wherein said display unit and said inputting unit set up in the client-side(s), said storage unit, said display character set generating unit and said password authentication unit set up in the client-side(s) or server-side.

11. The dynamic interactive identity authentication system of claim 10, characterized in that said client-side(s) is a bank ATM, a PC, a cell phone, or a terminal device of the Internet of Things.

12. The dynamic interactive identity authentication system of claim 10, characterized in generating a L-digit binary sequence by display character set generating unit at random based on the users password before generating said L display character sets said binary sequence comprising M valid digit(s) and L-M interference digit(s); said L display character sets being generated based on said binary sequence.

13. The dynamic interactive identity authentication system of claim 10, characterized in that said user password is in a form of plaintext; the length of said user password is an integer S which is greater than 0; said L is greater than S; said comparing the dynamic inputting code with the user code is a comparison between the dynamic inputting code and the user password after removing all interference inputting code from the dynamic inputting code, the identity authentication is passed if the result of said comparison is identical.

14. The dynamic interactive identity authentication system of claim 10, characterized in that said user password is in a form of plaintext; the length of said user password is an integer S which is greater than 0, said L equals S; said comparing the dynamic inputting code with the user password is a comparison between the dynamic inputting code and the user password after removing any of the characters corresponding to the interference character set both from the dynamic inputting code and the user password, the identity authentication is passed if the result of said comparison is identical.

15. The dynamic interactive identity authentication system of claim 10, characterized in that said user password is in a form of plaintext; the length of said user password is an integer S which is greater than 0, said L is less than S; said comparing the dynamic inputting code with the user password is a comparison between the dynamic inputting code and the user password after removing all interference inputting code from the dynamic inputting code and after removing the last S-L characters and any of the characters corresponding to the interference character set from the user password, the identity authentication is passed if the result of said comparison is identical.

16. The dynamic interactive identity authentication system of claim 10, characterized in that said user password is in a form of ciphertext, the length of said user password is a known fixed value S, S is an integer greater than 0; said L display character sets form S groups of display character set(s), the union set of each group of the display character set(s) is the parent character set; wherein, L is greater than S; said comparing the dynamic inputting code with the user password is a comparison between the user password in ciphertext and a guessing code in ciphertext, said guessing code in ciphertext is obtained by using the method to encrypt the user password to encrypt a guessing code which is obtained by choosing S characters from the dynamic inputting code, the identity authentication is passed if the result of said comparison is identical, the identity authentication fails if the results of said comparison are not identical after comparing all possible guessing codes.

17. The dynamic interactive identity authentication system of claim 10, characterized in that said user password is in a form of ciphertext, and the length of the user password is an unknown indefinite value R, R is an integer greater than 0, said user password has a maximum allowable length Q, Q is a known integer greater than 1; said L display character sets form Q groups of display character sets, the union set of each group of display character sets is the parent character set; said L is greater than Q; when comparing the dynamic inputting code with the user password, first make a guess for the length R of the user password in a range between 1 and Q; then choose R characters from the dynamic inputting code to form a guessing code, encrypt the guessing code by the same method to encrypt the user password and obtain a guessing code in ciphertext; and then compare the user password in ciphertext with the guessing code in ciphertext, the identity authentication is passed if the result of said comparison is identical, the identity authentication fails if the results of said comparison are not identical after comparing all possible guessing codes.

18. The dynamic interactive identity authentication system of claim 17, characterized in that said system further comprising a functional module which receives identity authentication information from the password authentication unit and performs the function of designated functional unit.

19. The system for dynamic interactive identity authentication of claim 18, characterized in that said designated functional unit comprising a cash deposit unit, a cash withdrawal unit, a transfer unit or a password changing unit.

* * * * *